United States Patent
Lee et al.

(10) Patent No.: US 11,476,465 B2
(45) Date of Patent: Oct. 18, 2022

(54) ANODE ACTIVE MATERIAL AND PREPARATION METHOD THEREFOR

(71) Applicant: SAMSUNG SDI CO., LTD., Yongin-si (KR)

(72) Inventors: Soojeong Lee, Yongin-si (KR); Changsu Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 8 days.

(21) Appl. No.: 16/462,386

(22) PCT Filed: Nov. 9, 2017

(86) PCT No.: PCT/KR2017/012669
§ 371 (c)(1),
(2) Date: May 20, 2019

(87) PCT Pub. No.: WO2018/093092
PCT Pub. Date: May 24, 2018

(65) Prior Publication Data
US 2019/0341613 A1 Nov. 7, 2019

(30) Foreign Application Priority Data
Nov. 18, 2016 (KR) .................. 10-2016-0154447

(51) Int. Cl.
*H01M 4/587* (2010.01)
*H01M 4/505* (2010.01)
(Continued)

(52) U.S. Cl.
CPC .......... *H01M 4/587* (2013.01); *H01M 4/505* (2013.01); *H01M 4/525* (2013.01); *H01M 10/0525* (2013.01)

(58) Field of Classification Search
CPC ...... H01M 4/505; H01M 4/525; H01M 4/587; H01M 10/0525
See application file for complete search history.

(56) References Cited

U.S. PATENT DOCUMENTS

| | | | |
|---|---|---|---|
| 7,718,307 B2 | 5/2010 | Shimizu et al. | |
| 10,199,644 B2 | 2/2019 | Hwang et al. | |

(Continued)

FOREIGN PATENT DOCUMENTS

| | | |
|---|---|---|
| CN | 102832365 A | 12/2012 |
| EP | 2432050 A | 3/2012 |

(Continued)

OTHER PUBLICATIONS

Supplemental European Search Report issued in EP Application No. 17872686.5 dated Apr. 21, 2020.
(Continued)

*Primary Examiner* — Osei K Amponsah
(74) *Attorney, Agent, or Firm* — Lee IP Law, P.C.

(57) ABSTRACT

Provided is an anode active material, including: an amorphous carbon material in which the ratio of moieties having a distance $d_{002}$ of 3.77 Å or more between crystal planes is 4% to 15% based on the entire crystal plane distance distribution. When the anode active material is used, the lifespan characteristics of a lithium battery may be improved while exhibiting high capacity.

16 Claims, 2 Drawing Sheets

(51) Int. Cl.
*H01M 4/525* (2010.01)
*H01M 10/0525* (2010.01)

(56) References Cited

U.S. PATENT DOCUMENTS

| | | | |
|---|---|---|---|
| 2010/0143800 A1* | 6/2010 | Sawada | H01M 4/485 429/220 |
| 2012/0321950 A1* | 12/2012 | Okumura | H01M 4/13 429/215 |
| 2013/0070390 A1 | 3/2013 | Lee et al. | |
| 2014/0178764 A1* | 6/2014 | Park | H01M 10/0525 429/231.8 |
| 2017/0317383 A1* | 11/2017 | Kawabe | H01M 4/587 |

FOREIGN PATENT DOCUMENTS

| | | |
|---|---|---|
| EP | 2515365 A | 10/2012 |
| EP | 2747178 A | 6/2014 |
| JP | H 08104510 A | 4/1996 |
| JP | 2013-004215 A | 1/2013 |
| KR | 2003-0033789 A | 5/2003 |
| KR | 2007-0001212 A | 1/2007 |
| KR | 2013-0030574 A | 3/2013 |
| KR | 10-2014-0092506 A | 7/2014 |
| KR | 2014-0081466 A | 7/2014 |
| KR | 10-2016-0080618 | 7/2016 |
| KR | 10-2016-0085998 A | 7/2016 |
| KR | 10-1640392 B1 | 7/2016 |

OTHER PUBLICATIONS

International Search Report for PCT/KR2017/012669 filed Nov. 9, 2017.
Korean Office action dated Dec. 4, 2020.
Chinese Office action dated Jul. 30, 2021.

* cited by examiner

ANODE ACTIVE MATERIAL AND PREPARATION METHOD THEREFOR

CROSS-REFERENCE TO THE RELATED APPLICATION

This is the U.S. national phase application based on PCT Application No. PCT/KR2017/012669, filed Nov. 9, 2017, which is based on Korean Patent Application No. 10-2016-0154447, filed Nov. 18, 2016, the entire contents of all of which are hereby incorporated by reference.

TECHNICAL FIELD

The present disclosure relates to an anode active material and a preparation method therefor.

BACKGROUND ART

Lithium secondary batteries are used as power sources for driving portable electronic appliances such as video cameras, mobile phones, and notebook computers. Rechargeable lithium secondary batteries have three times higher energy density per unit weight than known lead batteries, nickel-cadmium batteries, nickel metal hydride batteries, and nickel-zinc batteries, and may be charged at high speed.

A lithium secondary battery produces electrical energy using an oxidation-reduction reaction occurring when lithium ions are inserted into or desorbed from a cathode and an anode in a state in which an organic electrolyte or a polymer electrolyte is charged between the anode and cathode capable of intercalating/deintercalating lithium ions.

Generally, the theoretical capacity of a battery varies depending on the kind of an electrode active material, but there is a problem that charge and discharge capacities decrease with the progress of cycles. The greatest cause of such a phenomenon is that electrode active materials are separated from each other or an electrode active material and a current collector are separated from each other due to the volume changes of electrodes occurring according to the progress of the charge and discharge of the battery, and thus the electrode active materials cannot perform their own functions. Further, lithium ions occluded in the anode cannot escape properly in the process of occlusion and desorption to decrease the active sites of the anode, and thus the charge-discharge capacity and lifespan characteristics of a battery deteriorate according to the progress of cycles.

In particular, recently, attempts have been made to use lithium secondary batteries as power sources for driving hybrid vehicles or electric vehicles or power sources for power storage. For this purpose, it is required that lithium secondary batteries may be charged and discharged and have excellent cycle characteristics.

Therefore, there is a high need for the development of an active material for manufacturing a lithium rechargeable battery which is structurally stable and has a high efficiency and a long life span, even if charging/discharging cycles are repeated.

DESCRIPTION OF EMBODIMENTS

Technical Problem

An aspect of the present disclosure is to provide an anode active material including a novel amorphous carbon material.

Another aspect of the present disclosure is to provide an anode employing the anode active material.

Yet another aspect of the present disclosure is to provide a lithium battery having improved lifespan characteristics by employing the anode.

Still another aspect of the present disclosure is to provide a method of preparing the anode active material.

Solution to Problem

In an aspect of the present disclosure, there is provided an anode active material including an amorphous carbon material in which the ratio of moieties having a distance $d_{002}$ of 3.77 Å or more between crystal planes is 4% to 15% based on the entire crystal plane distance distribution.

In another aspect of the present disclosure, there is provided an anode for a lithium battery including the anode active material.

In yet another aspect of the present disclosure, there is provided a lithium battery including the anode.

In still another aspect of the present disclosure, there is provided a method of preparing an anode active material, including the steps of:

(a) first calcination a precursor of an amorphous carbon material at temperature of 500° C. to 700° C. for 20 minutes to 40 minutes under a gas atmosphere; and (b) second calcination the first calcinated precursor of the amorphous carbon material at a temperature of 600° C. to 1000° C. for 0.5 hours to 2 hours under an inert gas atmosphere, after the first calcination.

Advantageous Effects of Disclosure

In the lithium battery according to an embodiment, an anode active material including a novel amorphous carbon material is employed, thereby improving lifespan characteristics.

MODE OF DISCLOSURE

Figure 1:
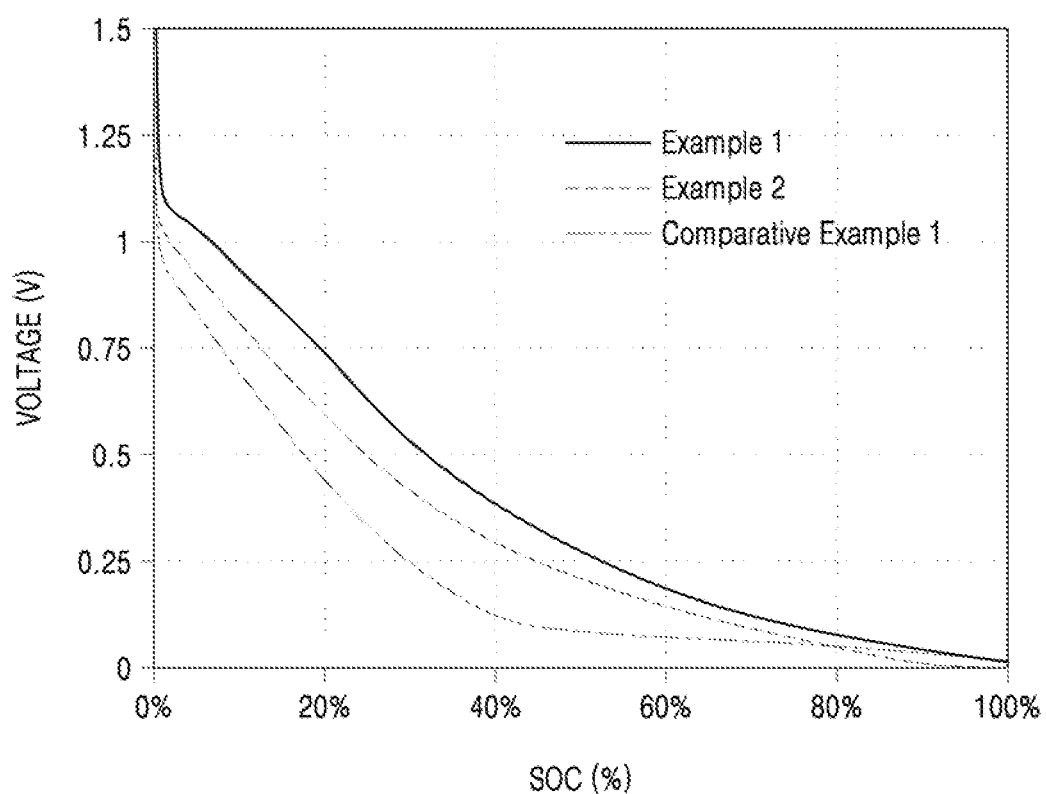
FIG. 1 is a graph showing the capacity ratios of the lithium batteries manufactured according to Examples 1 and 2 and Comparative Example 1.

Hereinafter, the present disclosure will be described in more detail.

Generally, a carbon-based anode active material may have two types of capacity exhibiting mechanisms. One of the two types of capacity exhibiting mechanisms is a lithium inserting mechanism at an operating voltage of 0.25 V or lower. In this mechanism, an energy barrier is high, and lithium ions are inserted into graphite particles of the carbon-based anode active material, thereby causing a structural strain. In particular, when amorphous carbon, not graphite, is used as an anode active material, the width La of a hexagonal plane laminate structure is small, the distance $d_{002}$ between carbon planes is large, and thus the attractive force between carbon planes is small, structural collapses occur rapidly due to repeated charge and discharge.

The other of the two types of capacity exhibiting mechanisms is a lithium inserting mechanism at an operating voltage of 0.25 V to 1.5 V. In this mechanism, unlike the mechanism at an operating voltage of 0.25 V or lower, an energy barrier is low, and thus lithium ions may be rapidly intercalated/deintercalated. Further, in this case, since the insertion gap in the structure where lithium insertion takes place is larger than the radius of a lithium ion, high structural stability may be exhibited in spite of repeated intercalation/deintercalation.

Thus, the present inventors found that, when a battery is manufactured using an anode active material exhibiting a high capacity at an operating voltage of 0.25 V to 2.0 V, not only high stability may be exhibited even in repetitive charging and discharging, but also lifespan characteristics of a battery may be improved. Based on this finding, the present disclosure has been completed.

The anode active material according to an aspect includes an amorphous carbon material in which the ratio of moieties having a distance $d_{002}$ of 3.77 Å or more between crystal planes is 4% to 15% based on the entire crystal plane distance distribution.

In this case, when the rate of moieties having a distance $d_{002}$ of 3.77 Å or more is out of the above range, and more than 15% based on the entire crystal plane distance distribution, the attractive force between carbon planes is small, and thus structural collapses occur rapidly due to repeated charge and discharge. On the other hand, when the ratio thereof is less than 4% based on the entire crystal plane distance distribution, the distance therebetween is too narrow, and thus the intercalation/deintercalation of lithium ions cannot easily occur, so that the charge-discharge reaction of a battery does not occur rapidly.

That is, when the ratio of moieties having a distance $d_{002}$ of 3.77 Å or more is out of the above range, the structural stability of the anode active material and the reversibility in the charge-discharge reaction are deteriorated, and thus the lifespan characteristics of the battery and the output characteristics of the battery may be deteriorated.

Accordingly, the present inventors found that even when the components and composition of the anode active material is similar to those of the known anode active material and thus the anode active material includes the same carbon material, the influence of the distance $d_{002}$ on the lithium battery may be greatly changed when the distance $d_{002}$ is different. Based on the finding, the present disclosure has been completed.

The distance $d_{002}$ of crystalline moieties included in the amorphous carbon material is at a level of 3.72 Å, but the distance between basal planes of a graphitic cluster driven at an operating voltage of 0.25 V to 2 V is more important during rapid charging. In this case, the distance between basal planes of the graphitic cluster is 3.77 Å or more. As this distance is densely distributed, it is advantageous for rapid charging.

In an embodiment, the ratio of moieties in which the distance $d_{002}$ is 3.77 Å or more is not particularly limited, but may be 5% to 15% based on the entire crystal plane distance distribution. The ratio of moieties in which the distance $d_{002}$ is 3.77 Å or more may be 5% to 10% based on the entire crystal plane distance distribution.

Further, the amorphous carbon material may be present alone or may be present in the form of at least one cluster in combination with at least one another amorphous carbon materials. The cluster is formed by the aggregation of two or more amorphous carbon material particles.

In an embodiment, the amorphous carbon material may be present in the form of two or more clusters, and an interval between the two or more clusters may be larger than a diameter of a lithium (Li) ion. Lithium (Li) ions may be intercalated/deintercalated between the two or more clusters. Since the interval between the two or more clusters is larger that of graphite, the energy barrier in the intercalation/deintercalation reaction is low, and thus the intercalation/deintercalation reaction may easily proceed. For example, the average interval between the two or more clusters is not particularly limited, but may be 4.10 Å to 4.70 Å. For example, the average interval between the two or more clusters may be 4.20 Å to 4.60 Å. For example, the average interval between the two or more clusters may be 4.30 Å to 4.50 Å.

In an embodiment, the area of an XRD peak having an XRD 2θ of 23.37° or less among XRD peaks of the amorphous carbon material may be 5% or more based on the total area of the XRD peaks of the amorphous carbon material.

The amorphous carbon material may include at least one of hard carbon, soft carbon, and graphite. For example, the amorphous carbon material may include at least one of soft carbon and graphite.

In an embodiment, the amorphous carbon material may include soft carbon.

In an embodiment, the amorphous carbon material may include a mixture of soft carbon and graphite.

In this case, the content ratio of soft carbon and graphite in the mixture is not particularly limited, but may be 99:1 to 70:30. For example, the content ratio of soft carbon and graphite in the mixture may be 99:1 to 80:20.

When the content ratio thereof is out of the above range of 70:30 and thus a larger amount of graphite is included, desired rapid charging characteristics cannot be obtained, and a polarization occurs in the soft carbon by a low operating voltage, thereby deteriorating lifespan characteristics.

In an embodiment, the area of an XRD peak having an XRD 2θ of 23.37° or less among XRD peaks of the soft carbon may be 5% or more based on the total area of the XRD peaks of the soft carbon. That is, the form of an XRD peak of the amorphous carbon material including the mixture may be determined depending on the form of an XRD peak of the high-content soft carbon.

As described above, even in the case of the anode active material including a carbon material having the same composition or content ratio, battery characteristics such as lifespan characteristics may be varied depending on the area ratio of an XRD pattern. In this case, an anode active material having an XRD peak area ratio of a preferable range may be obtained by controlling the distance $d_{002}$ of a silicon-based alloy.

The anode active material includes the aforementioned amorphous carbon material as an essential ingredient, and may further include a material of an anode active material commonly used in a lithium battery in addition to the ingredient.

As the material of the anode active material, a lithium metal, an alloy thereof, a silicon oxide-based material, or a mixture thereof.

The content of the material the anode active material used together with the amorphous carbon material may be 50 wt % to 99 wt % based on the total content of the amorphous carbon material and the material of the anode active material.

When the amorphous carbon material is a major ingredient of the anode active material, the content of the amorphous carbon material may be 90 wt % to 99 wt % based on the total content of the amorphous carbon material and the material of the anode active material.

Hereinafter, a method of preparing an anode active material including the amorphous carbon material will be described.

According to an embodiment, the method of preparing an anode active material includes the steps of:

(a) first calcination a precursor of an amorphous carbon material at a temperature of 500° C. to 700° C. for 20 minutes to 40 minutes under a gas atmosphere; and (b) second calcination the first calcinated precursor of the amorphous carbon material at a temperature of 600° C. to 1000° C. for 0.5 hours to 2 hours under an inert gas atmosphere, after the first calcination.

In this case, the second calcination may be performed at a temperature of 700° C. to 900° C. For example, the second calcination may be performed at a temperature of 700° C. to 800° C.

When the temperature in the second calcination is higher than 1000° C., out of the above range, it is difficult for the distance $d_{002}$ of the amorphous carbon material in the anode active material to satisfy the above range, and it is difficult to obtain desired characteristics of the present disclosure.

In the process (a), the precursor of the amorphous carbon material is not particularly limited, but may be selected from hydrocarbon, soft carbon, hard carbon, coal, coal-based pitch, petroleum-based pitch, mesophase pitch, coal-based oil, petroleum heavy oil, organic synthetic pitch, and combinations thereof.

In the process (a), the gas atmosphere is not particularly limited, but may be a nitrogen (N2) or argon (Ar) atmosphere.

In the process (b), the inert gas atmosphere is not particularly limited, but may be an argon (Ar) or nitrogen (N2) atmosphere.

An anode for a lithium battery according to another aspect includes: an anode current collector; and an anode active material layer located on at least one surface of the anode current collector and including the aforementioned anode active material.

The anode may include a binder between the anode current collector and the anode active material layer or in the anode active material layer. For the binder, reference is made to the following description.

The anode exhibits a capacity of 30% or more at an operating voltage of 0.25 V to 2.0 V based on the total cell capacity of a half cell using a lithium metal as an anode.

The anode exhibits a capacity of 40% or more at an operating voltage of 0.25 V to 1.5 V based on the total cell capacity of 0.2 C of a half cell using a lithium metal as an anode at an operating voltage of 0.01 V to 1.5 V.

As described above, in the lithium inserting mechanism at an operating voltage of 0.25 V or lower, an energy barrier is high, and lithium ions are inserted into graphite particles of the carbon-based anode active material, thereby causing a structural strain and causing the rapid structural collapses due to repeated charge and discharge. The anode according to the present disclosure exhibits a large percentage of capacity at a voltage of 0.25 V or more to solve such a problem, and the lithium battery employing the anode exhibits high-speed charge-discharge characteristics and excellent lifespan characteristics.

A lithium battery according to yet another aspect includes the aforementioned anode. For example, a lithium battery according to an embodiment may include an anode including the anode active material; a cathode located to face the anode; and an electrolyte located between the anode and the cathode.

The ratio of battery capacity of the lithium battery after charging and discharging at a charge-discharge rate of 4 C/4 C at 45° C. during 200 cycles may be 70% or more based on an initial battery capacity. For example, the ratio of battery capacity of the lithium battery after charging and discharging at a charge-discharge rate of 4 C/4 C at 45° C. during 200 cycles may be 80% or more based on an initial battery capacity.

That is, since the lithium battery has an excellent capacity retention ratio after a large number of cycles not only at room temperature but also at high temperature, this lithium battery may be applied as a battery for middle-size and large-size devices exhibiting high exothermic properties.

The ratio of charging time of the lithium battery in a constant current period when constant current-constant voltage charging is performed under a constant-voltage charge cut off condition of 2 C may be 60% or more based on total charging time.

The anode and the lithium battery including this anode may be manufactured by the following method.

The anode includes the aforementioned anode active material. For example, the anode may be manufactured by mixing the aforementioned anode active material, a binder, and a conductive material in a solvent to prepare an anode active material composition and then molding the composition into a target shape or applying the composition onto a current collector such as a copper foil.

The binder used in the anode active material composition, which is a component that assists the bonding of the anode active material and the conductive material and the bonding to the current collector, may be included between the anode current collector and the anode active material layer or in the anode active material layer, and may be added in an amount of 1 part by weight to 50 parts by weight based on 100 parts by weight of the anode active material. For example, the binder may be added in an amount of 1 part by weight to 30 parts by weight, 1 part by weight to 20 parts by weight, or 1 part by weight to 15 parts by weight, based on 100 parts by weight of the anode active material. Examples of the binder may include polyvinylidene fluoride, polyvinylidene chloride, polybenzimidazole, polyimide, polyvinyl acetate, polyacrylonitrile, polyvinyl alcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrile butadiene styrene, acrylonitrile butadiene styrene, phenol resin, epoxy resin, polyethylene terephthalate, polytetrafluoroethylene, polyphenylene sulfide, polyamideimide, polyetherimide, polyethersulfone, polyamide, polyacetal, polyphenylene oxide, polybutylene terephthalate, ethylene-propylene-diene terpolymer (EPDM), sulfonated EPDM, styrene butadiene rubber (SBR), fluorine rubber, and various copolymers.

The anode may further selectively include a conductive material in order to improve electrical conductivity by providing a conductive path to the aforementioned anode active material. As the conductive material, any material generally used for a lithium battery may be used, and examples thereof may include carbon-based materials such as carbon black, acetylene black, ketchen black, carbon fiber (for example, vapor growth carbon fiber); metal-based materials such as metal powder (copper, nickel, aluminum, and silver) and metal fiber; conductive polymers such as polyphenylene derivatives and mixtures thereof. The content of the conductive material may be appropriately adjusted. For example, the weight ratio of the anode active material and the conductive material may be in a range of 99:1 to 90:10.

As the solvent, N-methylpyrrolidone (NMP), acetone, water, or the like may be used. The content of the solvent may be 1 to 10 parts by weight based on 100 parts by weight of the anode active material. When the content of the solvent is within the above range, a work for forming an active material is easy.

Further, the anode current collector is generally made to have a thickness of 3 μm to 500 vim. The anode current collector is not limited as long as it has high conductivity without causing a chemical change in the battery. For example, the anode current collector may include copper, stainless steel, aluminum, nickel, titanium, or calcinated carbon, may include copper or stainless steel surface-treated with carbon, nickel, titanium or silver, or may include an aluminum-cadmium alloy. Further, the anode current collector may form fine irregularities on its surface to increase the adhesive force of the anode active material, and may various forms such as film, sheet, foil, net, porous body, foam, and nonwoven fabric.

An anode plate may be obtained by directly coating the current collector with the prepared anode active material or by casting the anode active material on a support and laminating an anode active material film separated from the support on a copper foil current collector. The anode is not limited to the above-described form, but may be in a form other than the above-described form.

The anode active material composition may be used not only for the production of electrodes of a lithium battery but also for the production of a printable battery by printing on a flexible electrode substrate. Separately, in order to manufacture a cathode, a cathode active material composition, in which a cathode active material, a conductive material, a binder, and a solvent are mixed, is prepared.

As the cathode active material, any cathode active material generally used in the art may be used. For example, the cathode active material may be any one of compounds represented by the following Formulae: $Li_aA_{1-b}B_bD_2$ (where, $0.90 \le a \le 1$, and $0 \le b \le 0.5$ are satisfied); $Li_aE_{1-b}B_bO_{2-c}D_c$ (where, $0.90 \le a \le 1$, $0 \le b \le 0.5$, and $0 \le c \le 0.05$ are satisfied); $LiE_{2-b}B_bO_{4-c}D_c$ (where, $0 \le b \le 0.5$ and $0 \le c \le 0.05$ are satisfied; $Li_aNi_{1-b-c}Co_bB_cD_\alpha$ (where, $0.90 \le a \le 1$, $0 \le b \le 0.5$, $0 \le c \le 0.05$, and $0 < \alpha \le 2$ are satisfied); $Li_aNi_{1-b-c}Co_bB_cO_{2-\alpha}F_\alpha$ (where, $0.90 \le a \le 1$, $0 \le b \le 0.5$, $0 \le c \le 0.05$, and $0 < \alpha < 2$ are satisfied); $Li_aNi_{1-b-c}Co_bB_cO_{2-\alpha}F_2$ (where, $0.90 \le a \le 1$, $0 \le b \le 0.5$, $0 \le c \le 0.05$, and $0 < \alpha < 2$ are satisfied); $Li_aNi_{1-b-c}Mn_bB_cD_\alpha$ (where, $0.90 \le a \le 1$, $0 \le b \le 0.5$, $0 \le c \le 0.05$, and $0 < \alpha \le 2$ are satisfied); $Li_aNi_{1-b-c}Mn_bB_cO_{2-\alpha}F_\alpha$ (where, $0.90 \le a \le 1$, $0 \le b \le 0.5$, $0 \le c \le 0.05$, and $0 < \alpha < 2$ are satisfied); $Li_aNi_{1-b-c}Mn_bB_cO_{2-\alpha}F_2$ (where, $0.90 \le a \le 1$, $0 \le b \le 0.5$, $0 \le c \le 0.05$, and $0 < \alpha < 2$ are satisfied); $Li_aNi_bE_cG_dO_2$ (where, $0.90 \le a \le 1$, $0 \le b \le 0.9$, $0 \le c \le 0.5$, and $0.001 \le d \le 0.1$ are satisfied); $Li_aNi_bCo_cMn_dGeO_2$ (where, $0.90 \le a \le 1$, $0 \le b \le 0.9$, $c \le 0.5$, $0 \le d \le 0.5$, and $0.001 \le e \le 0.1$ are satisfied); $Li_aNiG_bO_2$ (where, $0.90 \le a \le 1$ and $0.001 \le b \le 0.1$ are satisfied); $Li_aCoG_bO_2$ (where, $0.90 \le a \le 1$ and $0.001 \le b \le 0.1$ are satisfied); $Li_aMnG_bO_2$ (where, $0.90 \le a \le 1$ and $0.001 \le b \le 0.1$ are satisfied); $Li_aMn_2G_bO_4$ (where, $0.90 \le a \le 1$ and $0.001 \le b \le 0.1$ are satisfied); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above formulae, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the cathode active material may be $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ or $FePO_4$.

In an embodiment, the cathode may include $LiNi_{1-x-y}Co_xMn_yO_2$ ($0 \le x \le 0.5$, $0 \le y \le 0.5$) as a cathode active material.

The conductive material, binder and solvent in the cathode active material composition may be the same as those in the aforementioned anode active material composition. In some cases, a plasticizer may be further added to the cathode active material composition and the anode active material composition to form pores inside the electrode plate. The contents of the cathode active material, the conductive material, the binder and the solvent are at a level commonly used in a lithium battery.

The cathode current collector may have a thickness of 3 μm to 500 μm. The cathode current collector is not limited as long as it has high conductivity without causing a chemical change in the battery. For example, the cathode current collector may include copper, stainless steel, aluminum, nickel, titanium, or calcinated carbon, or may include copper or stainless steel surface-treated with carbon, nickel, titanium or silver. The cathode current collector may form fine irregularities on its surface to increase the adhesive force of the anode active material, and may various forms such as film, sheet, foil, net, porous body, foam, and nonwoven fabric.

A cathode plate may be prepared by directly coating the cathode current collector with the prepared cathode active material. Alternatively, the cathode plate may be prepared by casting the cathode active material on a support and laminating a cathode active material film separated from the support on the cathode current collector.

Next, a separator to be inserted between the anode and the cathode is prepared.

As the separator, any separator may be used as long as it is commonly used in a lithium battery. A separator having low resistance to the movement of ions in the electrolyte and superior in electrolyte wettability may be used. For example, the separator may include any one selected from glass fiber, polyester, Teflon, polyethylene, polypropylene, polytetrafluoroethylene (PTFE), and combinations thereof, and may be made in the form of nonwoven fabric or woven fabric. For example, a windable separator including polyethylene, polypropylene, or the like may be used in a lithium ion battery, and a separator having good electrolyte impregnation ability may be used in a lithium ion polymer battery. For example, the separator may be produced by the following method.

A polymer resin, a filler, and a solvent are mixed to prepare a separator composition. The separator composition is directly applied on an electrode and dried to form a separator. Alternatively, the separator composition is cast on a support and dried, a separation film is separated from the support, and then the separation film is laminated on the electrode to form a separator.

The polymer resin used in the production of the separator is not limited, and any material may be used as long as it may be used in a binder of an electrode plate. For example, as the polymer resin, a vinylidene fluoride/hexafluoropropylene copolymer, polyvinylidene fluoride (PVDF), polyacrylonitrile, polymethyl methacrylate, or a mixture thereof may be used.

Next, the electrolyte may be a lithium salt-containing non-aqueous electrolyte.

The lithium salt-containing non-aqueous electrolyte includes a non-aqueous electrolyte and lithium. As the non-aqueous electrolyte, a non-aqueous electrolyte, a solid electrolyte, an inorganic solid electrolyte, or the like are used.

As the non-aqueous electrolyte, for example, an aprotic organic solvent such as N-methyl-2-pyrrolidone, propylene carbonate, ethylene carbonate, ethylene carbonate, propylene carbonate, ethylene carbonate, propylene carbonate, ethylene carbonate, butylene carbonate, dimethyl carbonate, diethyl carbonate, ethylene carbonate carbonate, ethylene methylene carbonate, methylpropyl carbonate, ethyl propanoate, propyl acetate, dimethyl ester γ-butyrolactone, 1,2-dimethoxyethane, tetrahydrofuran, 2-methyltetrahydrofuran, dimethylsulfoxide, 1,3-dioxolane, formamide, dimethylformamide, dioxolane, acetonitrile, nitromethane, methyl formate, phosphoric acid triester, trimethoxymethane, a dioxolane derivative, sulfolane, methylsulfolane, 1,3-dimethyl-2-imidazolidinone, a propylene carbonate derivative, a tetrahydrofuran derivative, ether, methyl pyrophosphate, or ethyl propionate, may be used.

As the organic solid electrolyte, for example, a polyethylene derivative, a polyethylene oxide derivative, a polypropylene oxide derivative, a phosphate ester polymer, a polyester sulfide, a polyvinyl alcohol, a polyvinylidene fluoride, or a polymer including an ionic dissociation group may be used.

As the inorganic solid electrolyte, for example, nitride such as $Li_3N$, $LiI$, $Li_3N$—$LiI$—$LiOH$, $LiSiO_4$, $Li_2SiS_3$, $Li_4SiO_4$, $Li_4SiO_4$—$LiI$—$LiOH$, or $Li_3PO_4$—$Li_2S$—$SiS_2$; halide; or sulfate may be used.

As the lithium salt, any lithium salt may be used as long as it is commonly used in a lithium battery. As the material that may be easily dissolved in the non-aqueous electrolyte, for example, at least one of $LiCl$, $LiBr$, $LiI$, $LiClO_4$, $LiBF_4$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium 4-phenylborate, and amide may be used.

Lithium batteries may be classified into lithium ion batteries, lithium ion polymer batteries, and lithium polymer batteries depending on the kind of separator and electrolyte used, may be classified into cylindrical lithium batteries, rectangular lithium batteries, coin-shaped lithium batteries, and pouch-shaped lithium batteries depending on shape, and may be classified into bulk-type lithium batteries and thin film-type lithium batteries depending on size. Further, both a lithium primary battery and a lithium secondary battery are possible.

The lithium battery includes a cathode, an anode, and a separator located between the cathode and the anode. The aforementioned cathode, anode and separator are wound or folded to be accommodated in a battery container. Subsequently, an electrolyte is injected into the battery container, and the battery container is sealed by a sealing member to complete a lithium battery. The battery container may have a cylindrical shape, a rectangular shape, a thin film shape, or the like. The lithium battery may be a lithium ion battery.

The lithium secondary battery has a winding type and a stack type according to the shape of an electrode, and may be classified into a cylindrical shape, a rectangular shape, a coin shape, and a pouch shape according to the type of a cladding exterior material.

The manufacturing method of these batteries is well known in the art, and thus a detailed description thereof will be omitted.

The lithium battery may be used not only for a battery used as a power source of a small device but also as a unit battery for a middle-size or large-size battery module including a plurality of batteries.

Examples of the middle-size or large-size device may include, but are limited to, power tools operated by a power from an electric motor; electric vehicles including a hybrid electric vehicle (HEV) and a plug-in hybrid electric vehicle (PHEV); electric motorcycles including an electric bike (E-bike) and an electric scooter (E-scooter); electric golf carts; and power storage systems. In addition, the lithium battery may be used for all other applications requiring high output, high voltage and high temperature driving.

Hereinafter, exemplary embodiments will be described in more detail with reference to Examples and Comparative Examples. However, these Examples are set forth to illustrate technical ideas, and the scope of the present disclosure is not limited thereto.

Preparation of Anode

Example 1

First calcination was performed using a mesophase pitch as a precursor at 600° C. for 30 minutes at a temperature increase rate of 10° C./min under a nitrogen atmosphere.

Then, the first calcinated mesophase pitch was subjected to second calcination at 750° C. for 1 hour at a temperature increase rate of 10° C./min under an argon atmosphere to prepare soft carbon.

The soft carbon was used as an anode active material, SBR was used as a binder, CMS was used as a thickener, and the ratio of the anode active material/binder/CMC was set to 97.5/1.5/1, to prepare anode slurry. The anode slurry was applied onto a copper current collector having a thickness of 8 μm using a known method. The copper current collector coated with the anode slurry was dried at room temperature, further dried at 120° C., and then rolled and punched to an anode to be applied to a cell of standard 18650.

Example 2

An anode was prepared in the same manner as in Example 1, except that the first calcinated mesophase pitch was subjected to second calcination at 800° C. for 1 hour at a temperature increase rate of 10° C./min under an argon atmosphere.

Comparative Example 1

An anode was prepared in the same manner as in Example 1, except that the first calcinated mesophase pitch was subjected to second calcination at 1200° C. for 1 hour at a temperature increase rate of 10° C./min under an argon atmosphere.

Example 3

An anode was prepared in the same manner as in Example 1, except that the soft carbon prepared in Example 1 and graphite were mixed at a ratio of 80:20, and the mixture was used as an anode active material.

Example 4

An anode was prepared in the same manner as in Example 1, except that the soft carbon prepared in Example 2 and graphite were mixed at a ratio of 80:20, and the mixture was used as an anode active material.

Comparative Example 2

An anode was prepared in the same manner as in Example 1, except that the soft carbon prepared in Example 2 and graphite were mixed at a ratio of 50:50, and the mixture was used as an anode active material.

Comparative Example 3

An anode was prepared in the same manner as in Example 1, except that the soft carbon prepared in Example 1 and graphite were mixed at a ratio of 20:80, and the mixture was used as an anode active material.

Comparative Example 4

An anode was prepared in the same manner as in Example 1, except that the soft carbon prepared in Example 2 and graphite were mixed at a ratio of 20:80, and the mixture was used as an anode active material.

Comparative Example 5

An anode was prepared in the same manner as in Example 1, except that the soft carbon prepared in Comparative Example 1 and graphite were mixed at a ratio of 80:20, and the mixture was used as an anode active material.

Comparative Example 6

An anode was prepared in the same manner as in Example 1, except that the soft carbon prepared in Comparative Example 1 and graphite were mixed at a ratio of 20:80, and the mixture was used as an anode active material.

Evaluation Example 1: Evaluation of Capacity Ratio

Half cells were prepared using the anodes prepared in Examples 1 to 4 and Comparative Examples 1 to 6 and an electrolyte in which $LiPF_6$ was dissolved in a mixed solvent of ethylene carbonate (EC), ethylene methylene carbonate (EMC), and dimethyl carbonate (DMC) (volume ratio: EC:EMC:DMC=2:4:4).

Figure 2:
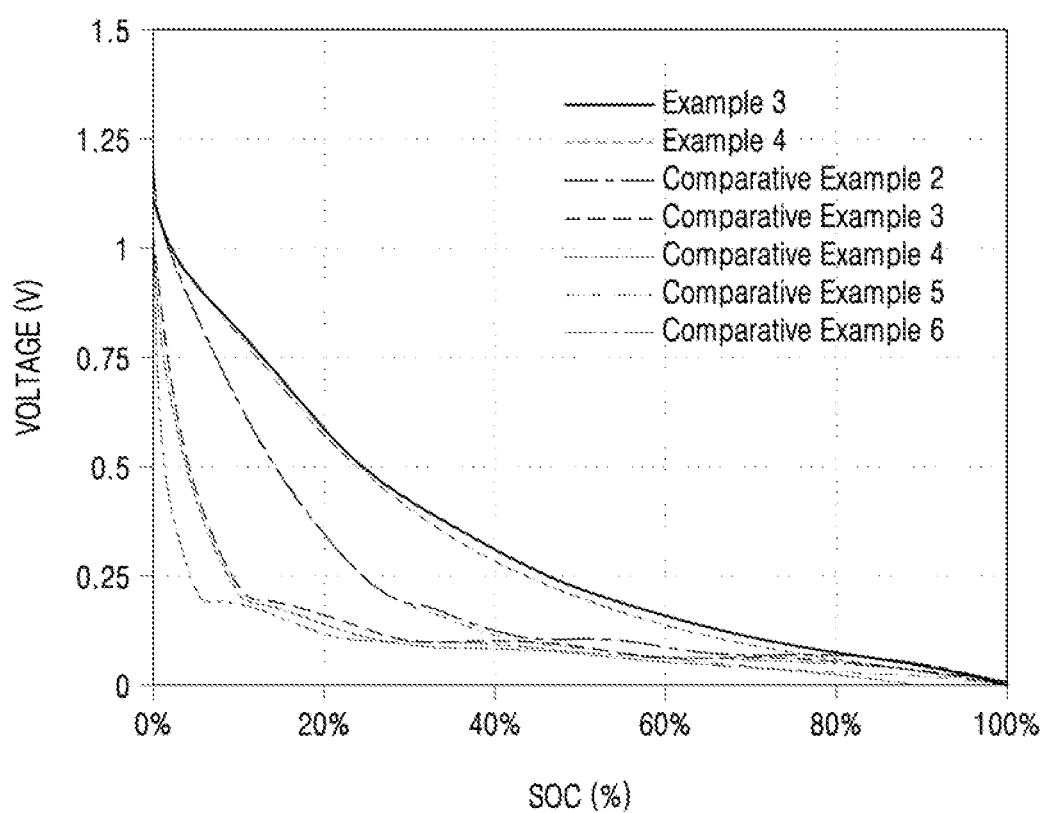
FIG. 2 is a graph showing the capacity ratios of the lithium batteries manufactured according to Examples 3 to 4 and Comparative Examples 2 to 6.

For each of the half cells, the exhibiting capacity at an operating voltage of 0.25 V to 5 V was divided by the reference capacity to determine a capacity ratio, and the results thereof are shown in Table 1 and FIGS. 1 and 2.

(Reference capacity=capacity exhibited to 0.2 C at an operating voltage of 0.01 V to 1.5 V by the half cell in which a lithium metal is used as an anode)

Evaluation Example 2: Measurement of XRD Area Ratio

With respect to the anode active materials prepared in Examples 1 to 4 and Comparative Examples 1 to 6, XRD peaks of 002 plane were measured from an X-ray diffraction spectrum using a CuK-α characteristic X-ray wavelength of 1.541 Å.

The ratio of area of XRD peaks each having a $d_{002}$ of 3.77 Å or more among XRD peaks based on the total area of the XRD peaks were measured, and defined as an XRD area ratio. The results thereof are given in Table 1 below.

TABLE 1

|  | Example 1 | Example 2 | Comparative Example 1 | Example 3 | Example 4 | Comparative Example 2 | Comparative Example 3 | Comparative Example 4 | Comparative Example 5 | Comparative Example 6 |
|---|---|---|---|---|---|---|---|---|---|---|
| Capacity ratio (%) | 50.53 | 45.70 | 28.84 | 44.86 | 44.17 | 22.82 | 9.84 | 9.21 | 25.3 | 8.29 |
| XRD area ratio (%) | 5.66 | 5.51 | 4.85 | 5.48 | 5.46 | 4.51 | 3.30 | 3.20 | 4.62 | 2.75 |

FIG. 1 is a graph showing the capacity ratios of the lithium batteries manufactured according to Examples 1 and 2 and Comparative Example 1, and FIG. 2 is a graph showing the capacity ratios of the lithium batteries manufactured according to Examples 3 to 4 and Comparative Examples 2 to 6.

As shown in Table 1 and FIGS. 1 and 2, it may be found that the lithium batteries of Examples 1 to 4 according to the present disclosure exhibit a high capacity ratio of 40% or more at an operating voltage of 0.25 V to 1.5 V.

Further, it may be found that the XRD area ratios in Examples 1 to 4 are 5% or more, whereas the XRD area ratios in Comparative Examples 1 to 6 are less than 5%.

In Comparative Examples 1 to 6, a carbon-based material was used as the anode active material. However, as shown in the above experimental results, it may be found that, even when soft carbon or a mixture of soft carbon and graphite is used as the anode active material, a significant difference in capacity ratio occurs due to a difference in characteristics such as distance $d_{002}$.

Example 5

(Preparation of Cathode)
$LiNi_{1/3}Co_{1/3}Mn_{1/3}O_2$ as a cathode active material, polyvinylidene fluoride (PVDF) as a binder, and a carbon conductive material (Denka Black) as a conductive material were mixed at a weight ratio of 90:4:6, and N-methylpyrrolidone as a solvent for adjusting viscosity was added such that the solid content thereof is 60 wt %, so as to prepare a cathode active material composition.

The cathode active material composition was applied onto an aluminum current collector having a thickness of 12 μm using a known method. The aluminum current collector coated with the composition was dried at room temperature, further dried at 120° C., and then rolled and punched to a cathode to be applied to a cell of standard 18650.

(Manufacture of Lithium Secondary Battery-Full Cell)
A propylene separator having a thickness of 14 μM was interposed between the anode and cathode prepared in Example 1, and an electrolyte was injected and compressed to prepare a cell of standard 18650. In this case, as the electrode, an electrolyte in which $LiPF_6$ was dissolved in a mixed solvent of ethylene carbonate (EC), ethylene methylene carbonate (EMC) and dimethyl carbonate (DMC) (volume ratio: EC:EMC:DMC=2:4:4) such that the concentration of $LiPF_6$ was 1.15 M.

Example 6

A lithium secondary battery was manufactured in the same manner as in Example 5, except that the anode prepared in Example 2 was used instead of the anode prepared in Example 1.

Example 7

A lithium secondary battery was manufactured in the same manner as in Example 5, except that the anode prepared in Example 3 was used instead of the anode prepared in Example 1.

Example 8

A lithium secondary battery was manufactured in the same manner as in Example 5, except that the anode prepared in Example 4 was used instead of the anode prepared in Example 1.

Comparative Example 7

A lithium secondary battery was manufactured in the same manner as in Example 5, except that the anode prepared in Comparative Example 1 was used instead of the anode prepared in Example 1.

Comparative Example 8

A lithium secondary battery was manufactured in the same manner as in Example 5, except that the anode prepared in Comparative Example 2 was used instead of the anode prepared in Example 1.

Comparative Example 9

A lithium secondary battery was manufactured in the same manner as in Example 5, except that the anode prepared in Comparative Example 3 was used instead of the anode prepared in Example 1.

Comparative Example 10

A lithium secondary battery was manufactured in the same manner as in Example 5, except that the anode prepared in Comparative Example 4 was used instead of the anode prepared in Example 1.

Comparative Example 11

A lithium secondary battery was manufactured in the same manner as in Example 5, except that the anode prepared in Comparative Example 5 was used instead of the anode prepared in Example 1.

Comparative Example 12

A lithium secondary battery was manufactured in the same manner as in Example 5, except that the anode prepared in Comparative Example 6 was used instead of the anode prepared in Example 1.

Evaluation Example 3: Evaluation of CC-Ratio

CC-ratios of the lithium secondary batteries manufactured according to Examples 5 to 8 and Comparative Examples 7 to 12 were measured.

The CC-ratio was measured as a ratio of charging time in a constant current period, based on the total charging time when constant current-constant voltage charging is performed under a constant current charging cutoff condition of 2 C. The measured results are given in Table 2 below.

Evaluation Example 4: Evaluation of High-Temperature Lifespan Characteristics

The lithium secondary batteries manufactured according to Examples 5 to 8 and Comparative Examples 7 to 12 were charged with a current of 4.0 C rate at 45° C. in a constant current mode (CC mode) up to a charging cutoff voltage of 4.2 V (vs. Li), and were discharged up to a discharging cutoff voltage of 2.7 V in a constant current mode of 4 C, and then the capacities thereof were measured.

Then, the capacity measurements were repeated up to the 2000th cycles.

The experimental results of lifespan characteristics are given in Table 2. Here, the capacity retention ratio (CRR) representing lifespan characteristics is defined by Equation 1 below.

Capacity retention ratio [%]=[discharge capacity at each cycle/discharge capacity at first cycle]×100  <Equation 1>

TABLE 2

| | Example 5 | Example 6 | Comparative Example 7 | Example 7 | Example 8 | Comparative Example 8 | Comparative Example 9 | Comparative Example 10 | Comparative Example 11 | Comparative Example 12 |
|---|---|---|---|---|---|---|---|---|---|---|
| CC-ratio (%) | 71 | 67.52 | 52.77 | 69.34 | 63.90 | 47.34 | 28.42 | 26.12 | 47.99 | 19.0 |
| Lifespan characteristics (%) | 85.1 | 83.7 | 57.2 | 83.5 | 82.1 | 52.3 | 19 | 16 | 52.3 | 7 |

As may be seen in Table 2, it may be found that the CC-ratios and lifespan characteristics of the lithium secondary batteries (Examples 5 to 8) including the anode active material prepared so as to satisfy the $d_{002}$ condition of the present disclosure are improved as compared with those of the lithium secondary batteries (Comparative Examples 7 to 12) not including the anode active material.

Similarly to the results given in Table 1 above, it may be found that the improvement of the above characteristics is due to the specific constitution defined in the present disclosure regardless of the composition or content ratio of the anode active material, and thus lifespan characteristics, capacity characteristics, and the like may be remarkably improved as compared with conventional cases when a material satisfying the constitution of the present disclosure is used as the anode active material.

While one or more embodiments have been described with reference to the figures, it will be understood by those of ordinary skill in the art that various changes in form and details may be made therein without departing from the spirit and scope as defined by the following claims.

INDUSTRIAL APPLICABILITY

In the lithium battery according to an embodiment, an anode active material including a novel amorphous carbon material is employed, thereby improving lifespan characteristics.

The invention claimed is:

1. An anode active material, comprising: an amorphous carbon material in which a ratio of moieties having a distance $d_{002}$ of 3.77 Å or more between crystal planes is 5% to 9% based on the entire crystal plane distance distribution of the amorphous carbon material,
   wherein the amorphous carbon material includes at least one of hard carbon, soft carbon, and graphite, and
   wherein the amorphous carbon material includes a mixture of soft carbon and graphite, a content ratio of soft carbon and graphite in the mixture is 99:1 to 70:30.

2. The anode active material as claimed in claim 1, wherein, in the amorphous carbon material, an area of an XRD peak having an XRD $2\theta$ of 23.37° or less is 5% or more based on a total area of the XRD peaks of the amorphous carbon material.

3. The anode active material as claimed in claim 1, wherein an area of an XRD peak having an XRD $2\theta$ of 23.37° or less among XRD peaks of the soft carbon is 5% or more based on a total area of the XRD peaks of the soft carbon.

4. An anode for a lithium battery, comprising:
   an anode current collector; and
   an anode active material layer located on at least one surface of the anode current collector and including the anode active material as claimed in claim 1.

5. The anode for a lithium battery as claimed in claim 4, wherein the anode includes a binder between the anode current collector and the anode active material layer or in the anode active material layer.

6. The anode for a lithium battery as claimed in claim 4, wherein the anode exhibits a capacity of 30% or more at an operating voltage of 0.25 V to 2.0 V based on a total cell capacity of a half cell using a lithium metal as an anode.

7. The anode for a lithium battery as claimed in claim 4, wherein the anode exhibits a capacity of 40% or more at an operating voltage of 0.25 V to 1.5 V based on a total cell capacity of 0.2 C of a half cell using a lithium metal as an anode at an operating voltage of 0.01 V to 1.5 V.

8. A lithium battery, comprising:
   the anode as claimed in claim 4;
   a cathode located to face the anode; and
   an electrolyte located between the anode and the cathode.

9. The lithium battery as claimed in claim 8, wherein the cathode includes $LiNi_{1-x-y}Co_xMn_yO_2$ ($0 \leq x \leq 0.5$, $0 \leq y \leq 0.5$) as a cathode active material.

10. The lithium battery as claimed in claim 8, wherein a ratio of battery capacity of the lithium battery after charging and discharging at a charge-discharge rate of 4 C/4 C at 45° C. during 2000 cycles is 70% or more based on an initial battery capacity.

11. The lithium battery as claimed in claim 8, wherein a ratio of charging time of the lithium battery in a constant current period when constant current-constant voltage charging is performed under a constant-voltage charge cut off condition of 2 C is 60% or more based on total charging time.

12. A middle-size or large-size device battery module, comprising the lithium battery as claimed in claim 8.

13. A method of preparing the anode active material as claimed in claim 1, the method comprising:
   (a) first calcination of a precursor of an amorphous carbon material at a temperature of 500° C. to 700° C. for 20 minutes to 40 minutes under a gas atmosphere; and
   (b) second calcination of the first calcinated precursor of the amorphous carbon material at a temperature of 600° C. to 1000° C. for 0.5 hours to 2 hours under an inert gas atmosphere, after the first calcination.

14. The method as claimed in claim 13, wherein the second calcination is performed at a temperature of 700° C. to 900° C.

15. The anode active material as claimed in claim 1, wherein the amorphous carbon material is present alone or is present in the form of at least one cluster in combination with at least one other amorphous carbon material.

16. The anode active material as claimed in claim 15, wherein the amorphous carbon material is present in the form of two or more clusters, and an interval between the two or more clusters is greater than a diameter of a lithium (Li) ion.

* * * * *